US010887953B2

(12) United States Patent
Schreiter et al.

(10) Patent No.: US 10,887,953 B2
(45) Date of Patent: Jan. 5, 2021

(54) INDUCTION CRUCIBLE FURNACE WITH MAGNETIC-FLUX GUIDE

(71) Applicant: ABP INDUCTION SYSTEMS GMBH, Dortmund (DE)

(72) Inventors: Till Schreiter, Muelheim am der Ruhr (DE); Axel Walther, Waltrop (DE)

(73) Assignee: ABP INDUCTION SYSTEMS GMBH, Dortmund (DE)

( * ) Notice: Subject to any disclaimer, the term of this patent is extended or adjusted under 35 U.S.C. 154(b) by 252 days.

(21) Appl. No.: 15/751,851

(22) PCT Filed: Aug. 2, 2016

(86) PCT No.: PCT/DE2016/000301
§ 371 (c)(1),
(2) Date: Feb. 10, 2018

(87) PCT Pub. No.: WO2017/036438
PCT Pub. Date: Mar. 9, 2017

(65) Prior Publication Data

US 2018/0242409 A1 Aug. 23, 2018

(30) Foreign Application Priority Data

Sep. 1, 2015 (DE) ........................ 10 2015 011 433
Nov. 26, 2015 (DE) ........................ 10 2015 015 337

(51) Int. Cl.
*H05B 6/24* (2006.01)
*H05B 6/36* (2006.01)
(Continued)

(52) U.S. Cl.
CPC ........... *H05B 6/365* (2013.01); *F27B 14/063* (2013.01); *H05B 6/24* (2013.01); *H05B 6/367* (2013.01);
(Continued)

(58) Field of Classification Search
None
See application file for complete search history.

(56) References Cited

U.S. PATENT DOCUMENTS 3,704,336 A * 11/1972 Synnestvedt ............ H05B 6/24 373/153
3,811,001 A * 5/1974 Lethen ...................... F27D 3/18 373/153
(Continued)

FOREIGN PATENT DOCUMENTS

GB 14551287 B 9/1976

*Primary Examiner* — Ibrahime A Abraham
*Assistant Examiner* — Gyounghyun Bae
(74) *Attorney, Agent, or Firm* — Andrew Wilford

(57) ABSTRACT

The invention relates to an induction crucible furnace and to a magnetic return element for an induction crucible furnace. The induction crucible furnace has a corresponding coil and a plurality of magnetic return elements, which are designed in the form of individual units arranged on the outer lateral surface of the coil with peripheral spacing. In order to guide the magnetic flux produced by the coil, the magnetic return elements each have an assembly consisting of a plurality of elongate individual elements of magnetically permeable material that are electrically insulated from each other and extend parallel to the furnace axis. Said individual elements consist at least partially of bars, which are electrically insulated from each other and the longitudinal axes of which extend parallel to the furnace axis. In this way, both eddy currents that hit the assembly from the radial direction and eddy currents that hit the assembly with a transverse component are minimized.

14 Claims, 1 Drawing Sheet

(51) Int. Cl.

| | |
|---|---|
| ***F27B 14/06*** | (2006.01) |
| *F27B 14/08* | (2006.01) |
| *F27B 14/10* | (2006.01) |

(52) U.S. Cl.

CPC . *F27B 2014/0862* (2013.01); *F27B 2014/102* (2013.01)

(56) References Cited

U.S. PATENT DOCUMENTS 3,875,322 A * 4/1975 Sundberg ................. H05B 6/34 373/152
3,996,442 A * 12/1976 Moreland, II ....... H05B 6/1245 219/624
4,531,036 A * 7/1985 Lewis ...................... C21D 1/10 148/574
4,622,679 A * 11/1986 Voss ......................... H05B 6/24 336/207
4,969,158 A * 11/1990 Larson ..................... H05B 6/24 373/152
5,126,663 A * 6/1992 Shinjo .................... G01D 5/147 123/617
5,194,708 A * 3/1993 Carter, Jr. .............. H05B 6/062 219/624
5,197,081 A * 3/1993 Fishman .................. H05B 6/22 219/647
5,247,539 A 9/1993 Gillhaus
5,416,794 A 5/1995 Cignetti
5,418,811 A * 5/1995 Ruffini .................. F27B 14/061 373/152
5,430,758 A 7/1995 Gillhaus
5,559,432 A * 9/1996 Logue .................... B82Y 15/00 244/234
5,671,245 A 9/1997 Nacke
5,901,170 A 5/1999 Peysakhovich
6,967,315 B2 * 11/2005 Centanni ................... A61L 2/07 219/628
8,558,364 B2 * 10/2013 Summers ............ B81C 1/00285 219/634
9,180,779 B2 * 11/2015 Oyobe .................... B60L 53/12
2002/0071626 A1 * 6/2002 Davis ...................... G01L 1/246 385/12
2003/0209535 A1 * 11/2003 Haimer ................. B23P 11/027 219/600
2004/0089655 A1 * 5/2004 Matsen .................... C21D 1/30 219/602
2004/0182855 A1 * 9/2004 Centanni ................... A61L 2/07 219/628
2005/0129087 A1 * 6/2005 Brun ..................... F27B 14/061 373/155
2008/0308550 A1 * 12/2008 Nemkov .............. B23K 13/025 219/607
2010/0289485 A1 * 11/2010 Eggimann .............. G01D 5/145 324/207.25
2010/0295299 A1 * 11/2010 Ziu ..................... B29C 65/3468 285/416
2014/0111053 A1 * 4/2014 Yoshizawa ........... H02K 1/2773 310/156.53
2014/0219854 A1 * 8/2014 Matsen ..................... B22F 3/03 419/29
2015/0177285 A1 * 6/2015 Higashi .............. G01R 19/0092 324/144

* cited by examiner

Fig. 1 Prior art
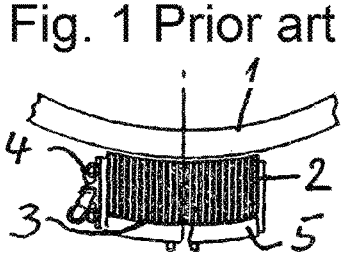
Fig. 2
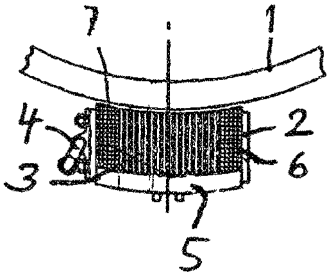
Fig. 3
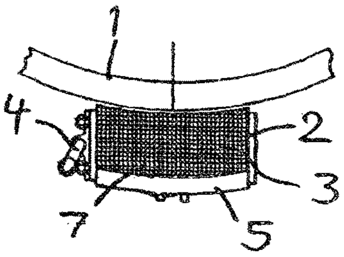
Fig. 4
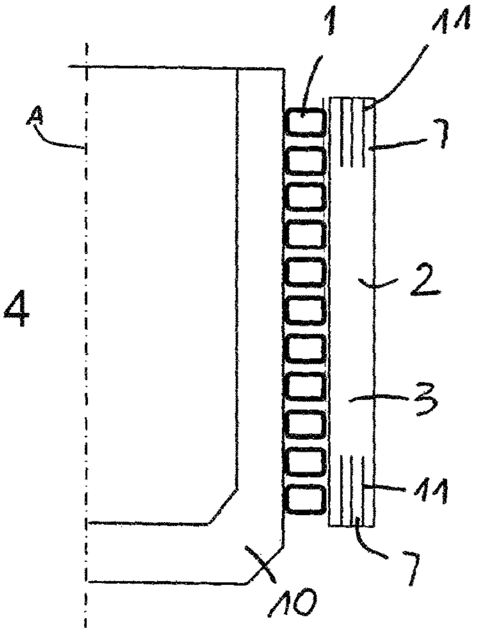
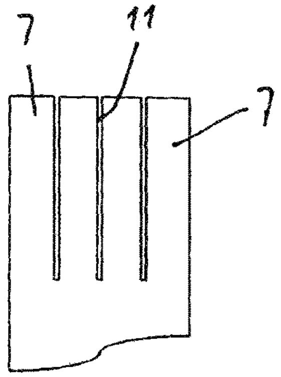
Fig. 5
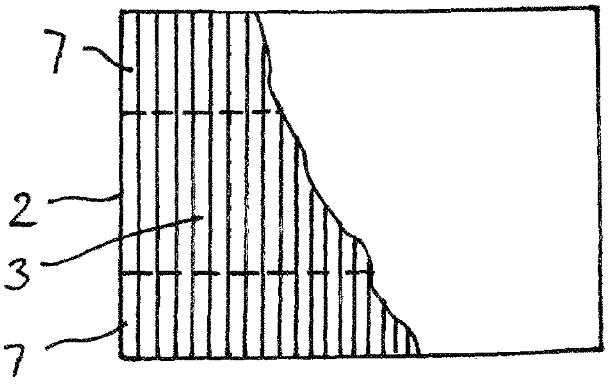
Fig. 6

INDUCTION CRUCIBLE FURNACE WITH MAGNETIC-FLUX GUIDE

CROSS REFERENCE TO RELATED APPLICATIONS

This application is the US-national stage of PCT application PCT/DE2016/000301 filed 2 Aug. 2016 and claiming the priority of German patent application 102015011433.6 itself filed 1 Sep. 2015 and German patent application 102015015337.4 itself filed 26 Nov. 2015.

FIELD OF THE INVENTION

The present invention is directed to a crucible induction furnace comprising a cylindrically shaped refractory crucible, a cylindrical coil extending around the crucible and a plurality of magnetic-flux guides formed as individual units arranged on the outer surface of the coil in a angularly spaced condition that units include an array of a plurality of elongate individual elements of magnetically permeable material that are electrically insulated with respect to one another and that extend parallel to the furnace axes and that serve for the guidance of the magnetic flux generated by the coil, respectively.

BACKGROUND OF THE INVENTION

Crucible induction furnaces for melting metals by the generation of magnetic fields that generate eddy currents in the metal and heat the same are known. Furthermore, it is known to provide such crucible induction furnaces with magnetic-flux guides that are arranged on the outer surface of a coil in a angularly spaced condition. During the operation of the furnace the alternating current flowing to the coil generates a magnetic alternating field that is guided through the metallic insertion material within the furnace crucible and through the individual elements of the magnetic-flux guides outside of the coil. The magnetic alternating field induces eddy currents in the magnetic insertion material that are converted into heat.

A crucible induction furnace of the above-described kind is known from EP 0 512 466 [U.S. Pat. No. 5,247,539]. Here the magnetic-flux guides are arranged on the outside of the coil in the design of individual packs distributed over the circumference of the coil spaced parallel to the furnace axis. The individual elements consist of iron sheets and form iron sheet packs having the purpose to guide the magnetic alternating flux. The magnetic flux is to have a path of small magnetic resistance that simultaneously causes only small eddy current losses.

The material guiding the alternating flux must have a high permeability and small eddy current losses. Customary for this is a structure of correspondingly thin transformer sheets with high specific electric resistance electrically insulated from one another. These sheets extend radially from the outer surface of the coil.

Correspondingly designed magnetic-flux guides are known from EP 0 563 802 [U.S. Pat. No. 5,430,758], DE 42 10 374 [Also U.S. Pat. No. 5,430,758], DE 41 15 278 [Also U.S. Pat. No. 5,247,539] and EP 0 688 145 [U.S. Pat. No. 5,671,245].

From EP 0 876 084 [U.S. Pat. No. 5,901,170] an induction furnace is known according to which the coil is surrounded by a layer of metallic and magnetically permeable material wherein this layer consists substantially of several discrete non-powdered elements that are bound in an electrically non-conducting matrix. The layer extends completely around the circumference of the furnace coil and the elements are preferably spherically formed elements.

OBJECT OF THE INVENTION

It is the object of the present invention to provide a crucible induction furnace of the above-cited kind that has an especially simple and low-cost construction with respect to its magnetic-flux guides.

SUMMARY OF THE INVENTION

According to the invention this object is achieved with a crucible induction furnace of the cited kind by the feature that the individual elements consist at least partly of rods electrically insulated with respect to one another and having longitudinal axes extending parallel to the furnace axis wherein the array comprises at least two rods not only radially but also angularly of the coil.

According to the prior art it is characterizing that those field lines emerging from the crucible furnace radially are taken up by the magnetic-flux guide and are guided from the beginning of the coil to the end of the coil. The generation of eddy currents is minimized by the design with the correspondingly thin transformer sheets electrically insulated with respect to one another.

However, with this prior art it is disadvantageous that those field lines impinging onto the said transformer sheets or electric sheets from an azimuthal direction (circumferential direction), i.e. with a cross component, cause corresponding eddy currents with the consequence of an additional heating of the electric sheet. By this additional heating a water cooling of the magnetic-flux guide can become necessary or can become necessary in an increased manner.

In contrast to that the costs and the place requirements at the magnetic-flux guide are reduced. One succeeds especially to avoid an additional cooling completely or at least partly. For this the electric sheets provided with the prior art are replaced completely or partly by rods electrically insulated with respect to one another. By this not only eddy currents impinging onto the array of the individual elements radially but also eddy currents impinging onto the array of the individual elements in azimuthal direction, i.e. with a cost component, are minimized.

In the inventive solution the array of the individual elements consists of a plurality of rods electrically insulated with respect to another and having longitudinal axes extending parallel to the furnace axis. The array has at least two rods not only radially but also angularly of the coil whereby the above-described effect of the reduction of eddy currents in both directions, i.e. radial and azimuthal, is achieved.

The rods used according to the invention are electrically insulated with respect to one another. For this the rods consisting of magnetically permeable material, especially metallic material as iron, have a coating of electrically insulating material that, for instance, is made by an immersion method. For this, for instance, suitable and known plastic materials can be used.

Preferably, a plurality of such rods is used that have correspondingly small dimensions, for instance in a range of 0.35×0.35 to 0.35×80 mm in cross-section (dimension angularly×dimension radially).

The at least two rods can have a different cross-sectional shape.

According to an embodiment of the inventive solution the array of individual elements consists completely of rods electrically insulated with respect to one another. According to another embodiment the array consists partly of sheets and partly of rods. Here the array has preferably a central region consisting of sheets and two lateral outer regions consisting of rods. According to this embodiment the generated eddy currents in the central region that can cause an additional heating of the sheets are prevented or at least reduced by the rods provided in the outer regions.

The magnetic-flux guides arranged around the circumference of the furnace coil are fixed on the outer surface of the furnace coil. For this the array of a respective magnetic-flux guide has fastening means fixing the array on the outer surface of the coil. Other kinds of fastening, as gluing, welding, are also possible. If mechanical fastening means are used the same are preferably formed as support that can surround the array of the individual elements preferably on all sides and above and below. The array of the individual elements can be pressed, glued or also cast into this support.

According to a special embodiment the rods and the sheets that are possibly present can be cast with a material, especially a synthetic resin, to obtain a complete pack. This complete pack, for instance, can be cast into the support or can be inserted into the support as insert and can be fixed in the same.

It is important that the individual elements (rods and possibly sheets) are provided in the pack or in the array in an intimate adjoining condition with respect to one another.

As regards the cross-sectional shape of the rods the same are preferably formed rectangularly, especially square, in cross-section. However, this does not exclude that the rods are formed round in cross-section, for instance, circularly, elliptically, etc. or are formed as polygon.

Preferably, with the inventive embodiment an additional cooling of the magnetic-flux guide, especially a water cooler arranged on the sides of the array, can be avoided. However, this does not exclude that, if necessary, the array of the individual elements is associated with cooling means, especially on the side surfaces.

According to another embodiment of the invention the elongate individual elements electrically insulated with respect to one another and extending parallel to the furnace axes are designed in such a manner that rods are provided only in the upper and/or lower region of the array while in the remaining region portions with larger cross-section are present.

This embodiment uses the cognition that the magnetic flux density impinging onto the magnetic-flux guide with a cross component has a relative maximum value at the upper and/or lower end of the magnetic-flux guide. Accordingly, the eddy currents have the greatest values at these locations.

Accordingly, for minimizing these greatest eddy currents it is primarily necessary to divide the magnetic-flux guide at the upper and/or lower end into individual rods. With this embodiment such a division into rods can be not necessary in the remaining zones of the magnetic-flux guide. An improved mechanical stability is a positive additional effect of this embodiment.

Especially with this embodiment the array comprises elongate individual elements including in the upper and/or lower region rods formed by slots extending parallel to the furnace axis. Accordingly, slotted individual elements are used that are preferably slotted at the upper and at the lower end.

The slots can extend angularly of the crucible furnace and/or radially of the same. Especially preferred is an embodiment according to which the array has radially arranged sheets that include in the upper and/or lower region rods formed by slots extending angularly. These sheets can be provided partly or completely above and/or below with at least one slot in order to provide in these regions the rods desired according to the invention.

Accordingly, in vertical direction the rods have not to be continuous. The individual elements can be rather formed as rods only over a part of their longitudinal extension, i.e. only over the upper and/or lower part, while the remaining part of the individual elements has a larger cross-section.

As already mentioned, the rods provided according to the invention are electrically insulated with respect to one another. The electric insulation can be realized, for instance, by an air gap or by any insulation material. Accordingly, the term "electrically insulated" is to cover all possible kinds of an insulation.

Furthermore, the invention is directed to a magnetic-flux guide for a crucible induction furnace of the above-described kind.

BRIEF DESCRIPTION OF THE DRAWING

In the following the invention is described by means of embodiments in connection with the drawing in detail. Of the drawing FIG. 1 is a horizontal section through a part of a prior-art crucible induction furnace wherein a magnetic-flux guide of the furnace is shown;

FIG. 2 is a view like FIG. 1 of a first embodiment of the invention;

FIG. 3 is a view like FIG. 1 a second embodiment of the invention;

FIG. 4 is a vertical section through a part of another embodiment of a crucible induction furnace with a magnetic-flux guide;

FIG. 5 is an enlarged view of the upper part of the magnetic-flux guide of FIG. 4; and FIG. 6 is a schematic front view of the magnetic-flux guide of FIGS. 4 and 5.

SPECIFIC DESCRIPTION OF THE INVENTION

FIG. 1 is a horizontal section through a part of a coil 1 that surrounds a crucible (not shown) of a prior-art crucible induction furnace. Individual magnetic-flux guides are angularly spaced around the circumference of the coil 1. These magnetic-flux guides 2 are formed as individual units angularly spaced around the outer surface of the coil 1. These units form an array of a plurality of elongate individual elements of magnetically permeable material electrically insulated with respect to one another and extending parallel to the furnace axes for guiding the magnetic flux generated by the coil 1. The embodiment of the prior art shown in FIG. 1 is an array of a plurality of thin electric sheets electrically insulated with respect to one another and parallel to one another. These electric sheets extend substantially radially from the furnace coil 1. This array 3 of electric sheets is located within a support 5 surrounding all the sides of the array 3, also the upper side and the lower side. The array 3 of electric sheets is pressed into the support 5.

A water cooler 4 is arranged on the one side surface of the support and serves for the compensation of corresponding eddy currents resulting from those field lines impinging from an azimuthal direction, i.e. with a cross component, onto the electric sheets and causing an additional heating of the sheets.

FIG. 2 shows a corresponding embodiment according to which the magnetic-flux guide 2 is designed according to the invention. Also in this case the magnetic-flux guide 2 is in contact with the outer surface of the furnace coil 1 and consists principally of an array 3 of individual elements. Of these individual elements only the central part is formed from thin electric sheets while the two lateral outer regions 6 consist of rods electrically insulated with respect to one another and having longitudinal axes extending parallel to the furnace axis. By this, eddy currents are reduced that are based on field lines impinging onto the array from an azimuthal direction. Also in this embodiment the array is surrounded by a support 5 with which a water cooler 4 is laterally associated. One can also not provide this water cooler on account of the outer regions of the array that are formed by the rods electrically insulated with respect to one another.

FIG. 3 shows a corresponding embodiment of a magnetic-flux guide according to which the complete array 3 is formed of rods 7 electrically insulated with respect to one another and having longitudinal axes extending parallel to the furnace axis.

With this embodiment the rods 7 are cast with a synthetic resin to form an insert that is fixed within the support 5.

The FIGS. 4 to 6 show another embodiment of a crucible induction furnace with a magnetic-flux guide. In the vertical section of FIG. 4 a part of a crucible furnace 10 with induction coil 1 is schematically shown. A magnetic-flux guide 2 is on the induction coil 1. In this embodiment the magnetic-flux guide comprises an array 3 of sheets radially extending parallel to one another. These sheets are subdivided at their upper end and at their lower end into individual rods 7 by slots 11 extending angularly of the crucible furnace 10. As with the preceding embodiments these rods are electrically insulated with respect to one another.

In the embodiment that is shown here a sheet is subdivided by slits 11 into four rods 7 arranged side by side at the upper end and at the lower end. These rods 7 are provided at a location where the greatest eddy currents occur.

FIG. 6 is a schematic front view of the magnetic-flux guide 2 with an array 3 of individual elements that include sheets arranged parallel to one another and radially and that are subdivided into rods 7 at the upper and lower end, respectively.

The invention claimed is:

1. A crucible induction furnace comprising:

a crucible that is cylindrical, refractory, and centered on a furnace axis, a coil extending cylindrically around the crucible, a plurality of magnetic-flux guides formed as individual units spaced angularly around an outer surface of the coil and each including an array of elongated individual elements of magnetically permeable material that are electrically insulated with respect to one another, that extend parallel to the furnace axis, and that guide a magnetic flux generated by the coil, the individual elements each consisting at least partly of rods electrically insulated with respect to one another and having longitudinal axes extending parallel to the furnace axis, each array including at least two rods radially and at least two rods angularly of the coil, and fastener fixing the array on the outer surface of the coil.

2. The crucible induction furnace according to claim 1, wherein the at least two rods have a different cross-sectional shape.

3. The crucible induction furnace according to claim 1, wherein each array consists completely of rods electrically insulated with respect to one another.

4. The crucible induction furnace according to claim 1, wherein each array consists partly of sheets and partly of rods.

5. The crucible induction furnace according to claim 4, wherein each array has a central region consisting of sheets and two lateral outer regions consisting of rods.

6. The crucible induction furnace according to claim 1, wherein the means formed as a support and that the array is pressed, glued or cast into the support.

7. The crucible induction furnace according to claim 1, wherein the rods are rectangular in cross-section.

8. The crucible induction furnace according to claim 1, wherein the rods are round in cross-section.

9. The crucible induction furnace according to claim 1, wherein each array side surfaces, the furnace further comprising:

a respective cooler at each of the side surfaces.

10. The crucible induction furnace according to claim 1, wherein the elongate individual elements of each array electrically insulated with respect to one another and extending parallel to the furnace axis are so constructed that rods are provided only in the upper and/or lower region of the respective element while portions with larger cross-section are thereadjacent.

11. A crucible induction furnace comprising:

a crucible that is cylindrical, refractory, and centered on a furnace axis, a coil extending cylindrically around the crucible, and a plurality of magnetic-flux guides formed as individual units spaced angularly around an outer surface of the coil and each including an array of elongated individual elements of magnetically permeable material that are electrically insulated with respect to one another, that extend parallel to the furnace axis, and that guide a magnetic flux generated by the coil, the individual elements consisting at least partly of rods electrically insulated with respect to one another and having longitudinal axes extending parallel to the furnace axis, each array consisting partly of sheets and partly of rods and including at least two of the rods not only radially but also angularly of the coil, the rods and sheets being cast with a synthetic resin to form a complete pack.

12. A crucible induction furnace comprising:

a crucible that is cylindrical, refractory, and centered on a furnace axis, a coil extending cylindrically around the crucible, and a plurality of magnetic-flux guides formed as individual units spaced angularly around an outer surface of the coil and each including an array of elongated individual elements of magnetically permeable material that are electrically insulated with respect to one another, that extend parallel to the furnace axis, and that guide a magnetic flux generated by the coil, the individual elements consisting at least partly of rods electrically insulated with respect to one another and having longitudinal axes extending parallel to the furnace axis, each array including at least two rods not only radially but also angularly of the coil, the elongate individual elements of each array electrically insulated with respect to one another and extending parallel to the furnace axis being so constructed that rods are provided only in the upper and/or lower region of the respective element while portions with larger cross-section are thereadjacent, each array having elongated individual elements comprising in the upper and/or lower region rods formed by slots extending parallel to the furnace axis.

13. The crucible induction furnace according to claim 12, wherein the rods extend angularly of the crucible furnace or radially of the same.

14. The crucible induction furnace according to claim 12, wherein the array includes radially arranged sheets comprising in the upper and/or lower region rods formed by angularly extending slots.

* * * * *